United States Patent
Jiang et al.

(10) Patent No.: US 6,997,071 B2
(45) Date of Patent: Feb. 14, 2006

(54) NON-DESTRUCTIVE METHOD OF PREDICTING PERFORMANCE OF CERAMIC COMPONENTS

(75) Inventors: Guangqiang Jiang, Castaic, CA (US); Kate E. Purnell, Valencia, CA (US); Gary D. Schnittgrund, Granada Hills, CA (US); Joseph H. Schulman, Granada Hills, CA (US)

(73) Assignee: Alfred E. Mann Foundation for Scientific Research, Santa Clarita, CA (US)

(*) Notice: Subject to any disclaimer, the term of this patent is extended or adjusted under 35 U.S.C. 154(b) by 342 days.

(21) Appl. No.: 10/651,462

(22) Filed: Aug. 29, 2003

(65) Prior Publication Data

US 2005/0044972 A1    Mar. 3, 2005

(51) Int. Cl.
    *G01N 33/00* (2006.01)
(52) U.S. Cl. ............................................. 73/866
(58) Field of Classification Search .................. 73/866
    See application file for complete search history.

(56) References Cited

U.S. PATENT DOCUMENTS

| | | | | |
|---|---|---|---|---|
| 4,559,824 A | * | 12/1985 | Soma et al. | 73/866 |
| 4,722,915 A | * | 2/1988 | Soma et al. | 501/103 |
| 5,193,540 A | | 3/1993 | Schulman et al. | |
| 5,324,316 A | | 6/1994 | Schulman et al. | |
| 2002/0010070 A1 | | 1/2002 | Cales et al. | |
| 2002/0031675 A1 | | 3/2002 | Cales et al. | |

FOREIGN PATENT DOCUMENTS

| | | |
|---|---|---|
| EP | 1457470 | 9/2004 |
| JP | 2002362972 | 12/2002 |

OTHER PUBLICATIONS

Jiang, Accelerated Life Testing of Y-TZP Ceramic, Proceedings of the 6th Annual Grodins Graduate Research Symposium, Biomedical Engineering Department, USC, Los Angeles, California, Mar. 23, 2002, pp. 70-71.

Jiang, In-Vitro and In-Vivo Aging Tests of BION Micro-Stimulator, Proceedings of the 7th Annual Grodins Graduate Research Symposium, Biomedical Engineering Department, USC, Los Angeles, California, Mar. 29, 2003, pp. 3-4.

Jiang, In-Vitro and In-Vivo Test of 3Y-TZP Ceramics, Oral Presentation at the 54th Pacific Coast Regional Basic Science Division Meeting of the American Ceramic Society, Seattle, Washington, Oct. 1-4, 2002, pp. 1-5.

(Continued)

*Primary Examiner*—Robert Raevis
(74) *Attorney, Agent, or Firm*—Gary D. Schnittgrund

(57) ABSTRACT

The invention is a method of qualifying an implantable ceramic component made of high-purity dense yttria tetragonal zirconium oxide polycrystal (Y-TZP) by application of non-destructive tests. Specifically, a qualified Y-TZP ceramic component or witness sample is examined by X-ray diffraction to determine the initial monoclinic phase content. The component or witness sample is exposed to steam at 127° C. for a predetermined period of time, preferably six hours. The monoclinic phase content is determined for the post-exposure sample. The absolute difference between the initial monoclinic phase content and the post-exposure monoclinic phase content is calculated by difference. If the difference is less than 2.1% the sample is accepted. In an alternate embodiment, the components that pass the screening test are examined by ultrasonic testing to evaluate soundness of the ceramic component. Any component that presents a flaw of greater than three microns is rejected.

17 Claims, 2 Drawing Sheets

OTHER PUBLICATIONS

Thompson, I. and Rawlings, R.D.; "Mechanical Behavious of Zirconia and Zirconia-Toughened Aluminia in a Simulated Body Environment"; Biomaterials; 1990; 505-508; vol. 11, Issue 7.

Drummond, J.; "In Vitro Aging of Yttria-Stablized Zirconia"; J. Am. Ceram. Soc.; 1989; 675-676; 72 [4].

Drummond, J.; "Effects of In Vitro Agina of Magnesia-Stablized Zirconia"; J. Am. Ceram. Cos.; 1992; 1278-1280; 75 [5].

Piconi, C. and Maccauro, G.; "Zirconia as a Ceramic Biomaterial"; Biomaterials; 1999; 1-25; 20.

* cited by examiner

FIG. 3
Monoclinic Phase Growth in 127°C Steam
High-Purity Dense 3 m/o Yttria Tetragonal Zirconium Oxide Polycrystal (Y-TZP) for Surgical Implant Applications

| Source | Monoclinic Volume Fraction on surface (As Supplied), (M1) | Actual Exposure Time in 127°C Steam | Equivalent Exposure Time at 37°C (hours; years) | Monoclinic Volume Fraction After Soaking (M2) | Average Conversion Rate (%/hour) | Estimated Monoclinic Conversion After 6 hours Exposure | Actual Exposure Time until Spontaneous Flaking in 127°C Steam (hours) | Actual Exposure Time until Spontaneous Destruction in 127°C Steam (hours) | Projected Exposure Time until Spontaneous Flaking at 37°C (years) | Projected Exposure Time until Spontaneous Destruction at 37°C (years) |
|---|---|---|---|---|---|---|---|---|---|---|
| C (2mm dia.) | 2.8% | 12 hours | 6144; 0.70 | 13.3% | 0.88% | 5.3% | 78 | 171 | 4.6 | 10.0 |
| C* (2mm dia.) | 5.8% | 15 hours | 7680; 0.88 | 12.8% | 0.47% | 2.8% | 124 | 137 | 7.3 | 8.0 |
| C (2mm dia.) | 3.0% | 17 hours | 8704; 0.99 | 16.2% | 0.78% | 4.7% | 95 | 230 | 5.6 | 13.5 |
| Q (2mm dia.) | 1.7% | 18 hours | 9216; 1.1 | 7.8% | 0.34% | 2.0% | - | - | - | - |
| H (3mm dia.) | 9.7% | 24 hours | 12288; 1.40 | 30.0% | 0.86% | 5.2% | 522 | 643 | 30.5 | 37.6 |
| H (3mm dia.) | 8.3% | 24 hours | 12288; 1.40 | 37.3% | 1.2% | 7.2% | 264 | 394 | 15.4 | 23.1 |
| M (2mm dia.) | 2.2% | 18 hours | 9216; 1.1 | 3.1% | 0.05% | 0.3% | >1360 | >1360 | >80 | >80 |
| M (3mm dia.) | 1.2% | 18 hours | 9216; 1.1 | 2.0% | 0.04% | 2.0% | >1360 | >1360 | >80 | >80 |

* Surface finish rougher than other C tubes

NON-DESTRUCTIVE METHOD OF PREDICTING PERFORMANCE OF CERAMIC COMPONENTS

FIELD OF THE INVENTION

This invention relates to a method of predicting the useful life of an yttria-stabilized zirconia structure when implanted in living tissue.

BACKGROUND OF THE INVENTION

A widely employed bioceramic is alumina, which is classed as bioinert. The search for an ideal bioceramic has included alumina, hydroxyapatite, calcium phosphate, and other ceramics. The first use of aluminas for implants in orthopedics and dentistry was in the 1960's and they were employed in hip prostheses as early as 1970. Since those early days the quality and performance of aluminas have improved and high-purity, high-density, fine-grained aluminas are currently used for a wide range of medical applications, e.g. dental implants, middle ear implants, and hip or knee prostheses.

Although the aluminas currently available perform satisfactorily, a further improvement in strength and toughness would increase the safety factor and may extend usage to higher stressed components. A proposed candidate to add to this list is stabilized-zirconia because of its potential advantage over alumina of a lower Young's modulus, higher strength, and higher fracture toughness. Another advantage of stabilized-zirconia is low-wear residue and low coefficient of friction. Zirconia undergoes a destructive phase change on cooling at about 1000° C. from tetragonal to monoclinic, which necessitates phase stabilization by calcia, magnesia, hafnia, ceria, or yttria.

Yttria tetragonal zirconium oxide polycrystal (Y-TZP) ceramic, commonly known as Y-TZP, which typically contains three mole percent yttria, coupled with the small size of the particles, results in the metastable tetragonal state at room temperature. Under the action of a stress field in the vicinity of a crack, the metastable particles transform, with a 3% to 4% volume increase, by a shear-type reaction, to the monoclinic phase. Crack propagation is retarded by the transforming particles at the crack tip and by the compressive back stress on the crack walls behind the tip, due to volume expansion associated with transformation to the monoclinic phase.

The well-known transformation toughening mechanism is operative in zirconia ceramics whose composition and production are optimized such that most of the grains have the tetragonal crystal structure. Y-TZP ceramics mechanical properties in air at room temperature are superior to those of zirconia-toughened aluminas and to other classes of zirconias. To the knowledge of the inventors, the biocompatibility of Y-TZPs has not been fully assessed. However, the biocompatibility of the Y-TZP has been at least preliminarily investigated.

For example, in one study by Thompson and Rawlings [see I. Thompson and R. D. Rawlings, "Mechanical Behavior of Zirconia and Zirconia-Toughened Alumina in a Simulated Body Environment," Biomaterials, 11 [7] 505–08 (1990).], it was concluded that TZP demonstrated a significant strength decrement when aged for long periods in Ringer's solution and was therefore unsuitable as implant material.

Drummond [see J. L. Drummond, J. Amer. Ceram. Soc., 72 [4] 675–76 (1989)] reported that yttria-stabilized zirconia demonstrated low-temperature degradation at 37° C. with a significant decrement in strength in as short as period as 140 to 302 days in deionized water, saline, or Ringer's solution. He also reports on similar observation by others, where yttria-doped zirconia demonstrated a strength decrement in water vapor, room temperature water, Ringer's solution, hot water, boiling water, and post-in vivo aging.

Y-TZP components suffer a decrement in strength properties after short-term exposure to wet or humid environments. This degradation of mechanical properties occurs when moisture is present in any form, for example, as humidity or as a soaking solution for the Y-TZP component. Y-TZP components have been observed to spontaneously fall apart after times as short as a few weeks in room temperature water. This is of particular importance in living-tissue implanted devices that contain components made of this class of material. Successful long-term implantation of devices that contain yttria-stabilized zirconia components is not feasible unless performance prediction techniques are applied to verify acceptable long term device performance.

There is a need to predict the performance of components made of Y-TZP that are intended for long-term critical applications, such as implants in living-tissue.

BRIEF DESCRIPTION OF THE DRAWINGS

FIG. 3 presents ceramic tube exposure data.

DETAILED DESCRIPTION OF THE PREFERRED EMBODIMENT

A broadly applicable method of qualifying ceramic components for implantation in living tissue has been developed. It has been demonstrated that the phase transformation rate of tetragonal to monoclinic in high-purity dense yttria tetragonal zirconium oxide polycrystal (Y-TZP) is a predictor of component life.

A novel ceramic to metal brazed case has been designed for implantable microstimulators, such as the microstimulator of Advanced Bionics Corporation, 12740 San Fernando Road, Sylmar, Calif. U.S. Pat. Nos. 5,193,540 and 5,324,316 present developments related to this microstimulator and are incorporated in their entirety by reference herein. Y-TZP has been selected as the ceramic material because of its high strength, favorable fracture toughness, and biocompatibility. It provides a hermetic and robust housing for the electronic module located inside. The qualification method is equally applicable to other components, such as ceramic hip implants.

The strength decrement in a humid environment varies among Y-TZP ceramics, depending upon the quality of the ceramic and its composition. This variability is related to the differences in equilibrium of microstructural parameters such as: concentration and distribution of phase stabilizer, grain size, flaw population and distribution, residual stress, density, etc.

Figure 1:
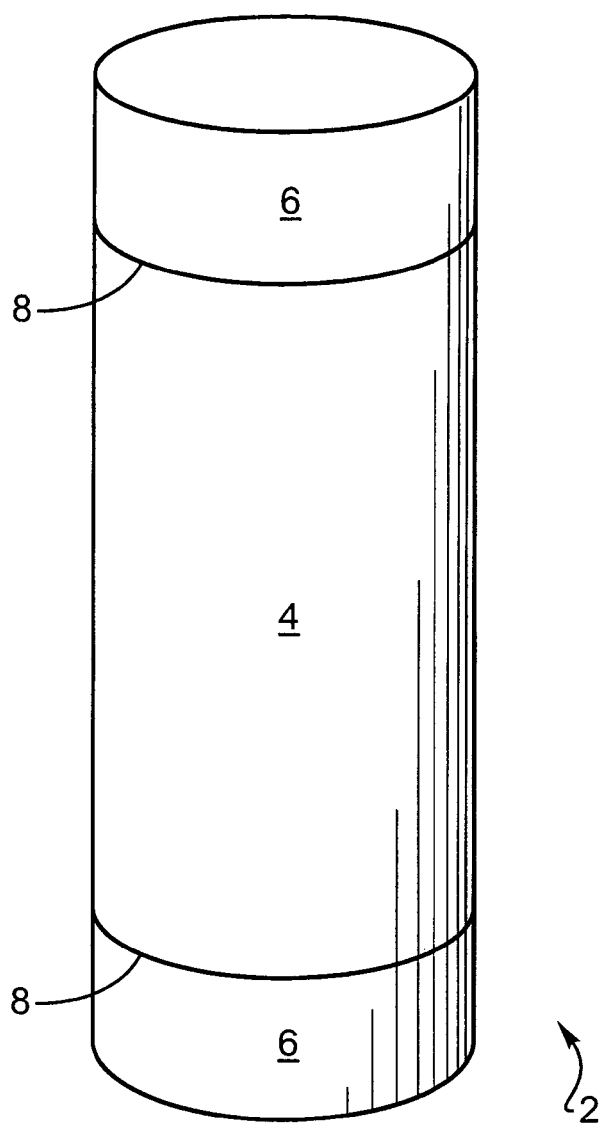
FIG. 1 presents the microstimulator.

A preferred microstimulator 2 is presented in FIG. 1, wherein a hollow ceramic tube 4 is preferably attached by brazing to an electrode 6 on either end of the microstimulator 2, thereby forming a hermetically sealed hollow enclosure suitable to contain electronics for either sensing or stimulating living tissue into which the microstimulator 2 may be implanted. The size of the hollow microstimulator 2 is preferably approximately 10 mm or less in diameter and 100 mm or less in length, preferably less than 6 mm in diameter with a wall thickness less than 2 mm, having a longitudinal shape capable of implantation in the immediate vicinity of selected areas of the body by expulsion through a hypodermic needle or other implantation device.

The ceramic tube 4 is comprised of a strong, hermetic material that is biocompatible, such as Y-TZP. In alternative embodiments, other stabilizer materials may be utilized in place of yttria, such as ceria, magnesia, calcia, hafnia, or other known stabilizing additives.

Figure 2:
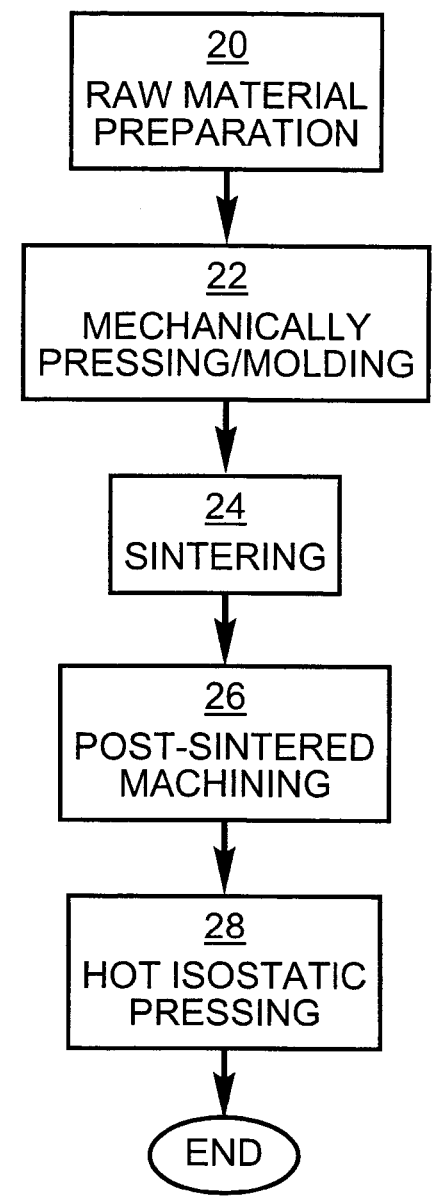
FIG. 2 presents the ceramic processing steps to form the material.

The Y-TZP ceramic tube 4 is formed by conventional ceramic forming processes, preferably including pressing and sintering, as shown in the respective blocks 22 and 24 of FIG. 2. The method of forming the tube includes raw material preparation 20, which includes particle size control and binder selection and introduction, as well as selecting the stabilizer. Post-sintering, the dense ceramic is optionally machined as shown in block 26 to final dimensions and to the required surface finish. The ceramic tube 4 is optionally further processed by hot isostatic pressing (HiPping) as shown in block 28 or other known densification methods.

The ceramic article is preferably exposed to 127° C. steam, although in an alternative embodiment, the ceramic could be exposed to superheated water to achieve the same result. X-ray diffraction is used to measure the monoclinic phase content by surface examination before and after the article is exposed to the steam milieu. The monoclinic volume fraction is calculated from the modified Garvie-Nicholson equation, as described herein.

As part of the ceramic article acceptance procedure, the article is soaked in 127° C. steam for a predetermined time, preferably six hours. The absolute difference in monoclinic phase content is calculated by subtracting the post-exposure monoclinic phase content, expressed in percent, from the initial monoclinic phase content, expressed in percent. If the absolute value of the monoclinic phase content difference has increased by less than 2.1%, then the article is accepted.

It has been demonstrated, FIG. 3, that a 2.1% increase or greater in volume fraction of monoclinic phase in an otherwise qualifying ceramic of Y-TZP, correlates well with premature failure of the ceramic after exposure to aging in a humid environment. Aging experiments conducted in 127° C. steam yielded monoclinic transformation rates, R, represented by the expression $$R = Q^{((T_2-T_1)/10)} = 2^{((127-37)/10)} = 2^9 = 512,$$

where Q is an empirically derived constant, $T_2$ is the qualification temperature, and $T_1$ is the long-term use temperature, preferably body temperature. Q has been found to be equal to 2, as derived by plotting the monoclinic phase content as a function of exposure time at 127° C. in steam. That is, the rate of conversion between the qualification test exposure of 127° C. and that experienced at body temperature of 37° C. is a factor of 512, with conversion being 512 times faster at the qualification test. [see G. Jiang, K. E. Fey, and J. Schulman, In-Vitro and In-Vivo Aging Tests of BION® Micro-stimulator, presented at the 54$^{th}$ Pac Coast Regional & Basic Sci Div Meeting of the Am. Ceram. Soc., Seattle, Wash., Oct. 1–4, 2002.]

As presented in FIG. 3, the Y-TZP components that are exposed to 127° C. steam spall and flake before they spontaneously degrade into powder, in some cases. The measured times are presented along with projected times to spalling and flaking at 37° C. and with projected times to spontaneous destruction at 37° C. In lieu of measured volume fraction conversion after six hours exposure to 127° C., a calculated estimated monoclinic conversion is presented that is based on the mean conversion rate expressed in percent. For example, the M (2 mm diameter) ceramic has a projected life in a moist environment at body temperature of greater than 80 years based on the 0.3% 6 hour conversion. By way of further example, the C (2 mm diameter) ceramic has a projected life of 10.0 years when exposed to a humid environment at body temperature. This sample is rejected based on the 6-hour conversion rate of 5.3%. The inventor has arbitrarily selected 80 years as the minimum projected life to spontaneous destruction at body temperature. It is obvious that one can select a different life expectancy and therefore establish a different short-term exposure as the acceptance test level.

In an alternate embodiment, the ceramic components are initially examined and subjected to a series of screening tests, per ASTM F 1873-98, before they are subjected to the steam exposure. Only those components that pass all tests are exposed to further qualification testing.

For ceramic components having a geometry that makes it difficult to test the corresponding mechanical properties directly, a "witness" sample may be substituted, where the witness sample has been processed in an identical series of process steps as the component itself.

The chemical composition of the ceramic component is measured by X-ray fluorescence (XRF) or mass spectroscopy to be greater than or equal to 99 weight percent $ZrO_2$ $HfO_2+Y_2O_3$; 4.5 to 5.4% $Y_2O_3$; less than 5% $HfO_2$; less than or equal to 0.5% $Al_2O_3$; and less than or equal to 0.5% of other total oxides.

The minimum bulk density of the ceramic component is greater than or equal to 6.00 g/cm$^3$. The total porosity is less than or equal to 1.0 volume percent and open porosity is no greater than 0.1 volume percent. Grain size is less than or equal to 0.6 microns as measured by the mean linear intercept distance.

The initial monoclinic phase content is 5 percent or less on a polished surface with surface finish equivalent to 0.05 microns. The peak height of the tetragonal phase, T(111) at 2θ=30.2°, and monoclinic phase, M($\bar{1}$11) at 2θ=28.2° and M(111) at 2θ=31.3° is identified by X-ray diffraction (copper K-alpha radiation) analysis to calculate the percent of monoclinic phase by the equation:

monoclinic phase content=$M(\bar{1}11)+M(111)/M(\bar{1}11)+T(111)+M(111)$.

The mean room temperature flexural strength is 800 MPa (116 Ksi) or greater by four point bending for a minimum of ten samples.

The minimum room temperature elastic modulus is 200 GPa (29×10$^6$ psi). The minimum Vickers hardness value is 1200 HV with a 1 Kg load and a 15 second dwell time. These measurements are all conducted in accord with ASTM F 1873.

An alternate embodiment of the acceptance test involves acoustic emission inspection of the accepted ceramic tubes along the longitudinal axis. If a flaw greater than 3 microns is observed, the tube is rejected.

As an additional embodiment of the acceptance test, the accepted ceramic tube may be loaded in a flexural bending mode so as to pre-load the tube at a known stress. The stress for this proof test type of qualification is preferably 800 MPa, although higher or lower stresses may be used to either change the acceptance rate or to assure a select minimum failure strength. Because of the small size of the tube, three-point bending may be utilized to pre-load the tube, although four-point bending is preferable when the sample is sufficiently long to allow such loading. Tubes that fail to survive the pre-load are thus culled from the sample population thereby giving a minimum strength for the survivors.

Obviously, many modifications and variations of the present invention are possible in light of the above teachings. It is therefore to be understood that, within the scope of the appended claims, the invention may be practiced otherwise than as specifically described.

What is claimed is:

1. A method for accelerating a qualification test for a ceramic component intended for implantation in living body tissue, comprising the steps of:
    selecting the ceramic component having a plurality of preselected physical characteristics, said characteristics including an initial monoclinic phase content;
    exposing the ceramic component to an aqueous milieu at a preselected elevated temperature for a preselected time period;
    removing the ceramic component from the aqueous milieu and measuring its post-exposure monoclinic phase content;
    measuring a difference between the initial and post-exposure monoclinic phase content; and
    qualifying the ceramic component for implant if the difference between the initial and post-exposure monoclinic phase content is less than a preselected value.

2. The method for accelerating a qualification test according to claim 1, wherein said step of exposing the ceramic component to an aqueous milieu is performed in steam.

3. The method for accelerating a qualification test according to claim 1, wherein said step of exposing the ceramic component to an aqueous milieu is performed at the preselected elevated temperature of 127° C.

4. The method for accelerating a qualification test according to claim 1, wherein said step of exposing the ceramic component to an aqueous milieu is performed for the preselected time of six hours.

5. The method for accelerating a qualification test according to claim 1, wherein said step of qualifying the ceramic component comprises selecting 2.1% as the preselected value.

6. The method for accelerating a qualification test according to claim 1, wherein said step of selecting the ceramic component comprises selecting an actual component to be implanted.

7. The method for accelerating a qualification test according to claim 1, wherein said step of selecting the ceramic component comprises selecting a witness sample.

8. The method for accelerating a qualification test according to claim 1, wherein said step of selecting the ceramic component comprises selecting an yttria tetragonal zirconium oxide polycrystal ceramic.

9. The method for accelerating a qualification test according to claim 1, wherein said step of selecting the ceramic component comprises selecting a stabilized zirconia ceramic.

10. The method for accelerating a qualification test according to claim 1, wherein said step of selecting the ceramic component comprises selecting a zirconia ceramic that is stabilized with one or more additives of yttria, ceria, calcia, hafnia or magnesia.

11. The method for accelerating a qualification test according to claim 1, wherein said step of selecting the ceramic component comprises selecting an yttria stabilized zirconia.

12. The method for accelerating a qualification test according to claim 1, further comprising the step of qualifying the ceramic component for implant by examining the ceramic acoustically.

13. The method for accelerating a qualification test according to claim 12, wherein said step of examining by acoustic test is rejecting said ceramic component if a flaw greater than three microns is detected.

14. The method for accelerating a qualification test according to claim 1, further comprising the step of conducting a proof test to 800 MPa in flexure.

15. A method for accepting a ceramic component for implantation in living tissue, comprising the steps of:
    selecting said ceramic component having a bulk density of at least 6.00 g/cm$^3$ or greater; a total porosity less than 1.0 volume percent; a total open porosity less than 0.1 volume percent; an average grain size equal to or less than 0.6 microns; an initial monoclinic phase content that is equal to or less than 5 percent; a surface finish of 0.05 microns; a mean flexural strength of at least 800 MPa; an elastic modulus of at least 200 GPa; a Vickers hardness of at least 1200 HV;
    exposing said ceramic component to steam at 127° C. for six hours;
    measuring a post-exposure monoclinic phase content in said ceramic component;
    determining a difference between said post-exposure monoclinic phase content and said initial monoclinic phase content;
    comparing said difference in monoclinic phase content to a preselected allowable limit; and
    accepting said ceramic component if said difference in monoclinic phase content is less than said preselected allowable limit.

16. The method for accelerating a qualification test according to claim 15, wherein said step of selecting said ceramic component having a mean flexural strength of at least 800 MPa is selecting a mean strength having greater than a 68% probability of success as determined with a sample population of at least ten samples.

17. The method for accelerating a qualification test according to claim 15, wherein said step of comparing the difference to a preselected allowable limit comprises selecting 2.1% as the allowable limit.

* * * * *